Patented July 22, 1947

2,424,401

UNITED STATES PATENT OFFICE 2,424,401

CIRCULATORY HORMONE PREPARATION AND PROCESS OF MAKING THE SAME

Alex Lesuk, Albany, N. Y., assignor to Winthrop Chemical Company, Inc., New York, N. Y., a corporation of New York No Drawing. Application January 6, 1943, Serial No. 471,454

13 Claims. (Cl. 167—75)

This invention relates to a highly potent circulatory hormone preparation which exerts a peripheral vaso-dilation when administered, e. g., intra-muscularly or orally, to man or experimental animals. This new preparation is useful, for example, in the treatment of certain peripheral vascular disorders of man.

While circulatory hormone preparations derived from animal pancreas or urine have been described previously, their obtainment has been attended by serious technical difficulties and drawbacks, such as the foul odor of putrefaction during steps of autolysis, the intractable character of certain precipitates which could be filtered or otherwise separated only with difficulty, and a distressing lack of reproducibility of the products. With previously known preparations the possibility has existed of contamination with greater or lesser amounts of impurities which in themselves have pronounced physiological action of kinds undesirable for a circulatory hormone preparation. Thus there exists the possibility that circulatory hormone preparations derived from urines may contain physiologically significant amounts of gonadotropic and other hormones and similarly circulatory hormone preparations from pancreatic glands may contain physiologically significant amounts of such impurities as peptone, insulin, histamine, choline, adenosine, and adenylic acid, all of which have a distinct action of their own on the heart and on the blood pressure.

The new circulatory hormone preparation of the instant invention is devoid of these defects and is prepared by a new, simplified, readily-reproduced process which avoids the attendant drawbacks and technical difficulties of prior processes. The new circulatory hormone preparation is at least 25–40 times more potent than the best prior preparation, and is free from physiologically significant amounts of peptone, insulin, histamine, choline, adenosine, adenylic acid, and other deleterious impurities. A corollary of the greatly increased potency of the instant preparation over prior preparations is the correspondingly greatly reduced amount of accompanying ballast, i. e., extraneous, foreign material. This is of course an especially important advantage in any product which is intended for injection into the human organism, since thereby the likelihood of the patient's possible reaction to foreign protein is correspondingly reduced.

In developing the new circulatory hormone preparation it has proved necessary to evolve a satisfactory method for standardizing the hormone. Various units have been used in the past to characterize the potency of a given preparation, but on critical re-examination it has been found that the previously defined units are actually not constant, reproducible entities. The unit finally adopted, and found to be constant, is defined as that quantity of the circulatory hormone which, when injected intravenously into an atropinized dog under sodium barbital anesthesia, will exactly counteract the pressor effect of a minimal hypertensive dose of epinephrine. Since dogs under comparable conditions vary widely in their vasomotor response to epinephrine, this minimal hypertensive dose must be established for each animal. Although in general the dose varies between 15 and 50 gamma for dogs of 10 to 15 kg. body weight, the dose is not necessarily proportional to body weight. It should be noted that the minimal hypertensive dose varies with the tone of the vasomotor system. Large or repeated doses of the circulatory hormone depress the tone of the peripheral vasomotor system as indicated by alteration of the threshold dosage of epinephrine. Successive doses of one or more units of the circulatory hormone should therefore be spaced at intervals of at least fifteen minutes in order to allow for recovery. In practice, this factor is largely corrected by allowing a sufficient period to elapse so that the threshold for normal epinephrine response (indicative of a normal autonomic equilibrium) is re-established. Three animals are used for each assay.

Essentially, the process of the instant invention is as follows: Animal pancreas is extracted with a dilute aqueous alkaline solution and the alkaline extract is digested with trypsin. This serves to liberate the hormone from its apparent combination with protein-like material in which state it occurs, at least in beef pancreas, although possibly not in hog pancreas. This digestion also serves to destroy the insulin and to convert some of the protein-like material into simpler more readily removed substances.

The mode of obtaining the alkaline pancreatic extract is subject to variation while bearing in mind that the hormone is rapidly destroyed above pH 9. For this reason the alkaline aqueous extract should not exceed pH 9 and with this restriction a wide variety of alkaline agents may be used, including sodium carbonate, potassium hydroxide, ammonium hydroxide, etc.

The alkaline tryptic hydrolysate is now adjusted to pH 5–7 in order to maintain the hormone at its most stable pH range, thereby avoiding unnecessary losses. For this acidification any acid may be used, including strong mineral acids or strong organic acids, such as hydrochloric acid, sulfuric acid, phosphoric acid, acetic acid, lactic acid and so on. It is advantageous to use trichloroacetic acid for this purpose because this acid also acts as a selective protein precipitate, and serves thereby to remove undesirable impurities more completely. Sulfosalicylic acid may be substituted for trichloroacetic acid but the product thereby obtained is somewhat discolored. To the aqueous solution is now added a water-soluble protein-precipitating salt in amounts sufficient to precipitate the saline-solution-insoluble impurities while retaining substantially all of the circulatory hormone dissolved in the aqueous liquor. After a few trials with any particular salt it is possible to determine with exactness just how much salt is required. Thus it is possible to effect a quite highly selective separation in this step, although obviously small losses are inevitable. Suitable salts for this step include sodium chloride, magnesium sulfate and especially ammonium sulfate or sodium sulfate. With the latter two salts the amount required is that for ¼ to ½ saturation of the aqueous liquor.

The resulting precipitated impurities, part of which are thrown down during the acidification step and the remainder of which are thrown down during the salting out step, are in a finely divided state which makes their removal by filtration or centrifugation quite difficult. It has been found however that if a dense, inert, water-immiscible liquid is added to and thoroughly mixed with the suspension the finely divided particles are collected at the liquid-liquid interface with clarification of the aqueous phase. The clear aqueous liquor can then be readily separated by decantation, filtration or centrifugation. The amount of dense, inert, water-immiscible liquid required for this step is readily determined by a trial, i. e. the requisite amount is determined by that required for clarification of a sample which may be withdrawn for test. Usually about 1/10 to 1/20 of the volume of the aqueous phase is required. Suitable dense, inert, water-immiscible liquids include the halohydrocarbons, and especially chloroform, carbon tetrachloride, chlorobenzene, bromobenzene and so on. However, since the action is due to a physical phenomenon, any water-immiscible liquid will serve provided that it is somewhat denser than the aqueous phase, and also provided that it is not reactive with the hormone.

It will be apparent that the steps of the adjustment to pH 5–7, salting out and mixing with the dense, inert, water-immiscible liquid can be performed in any sequence and these variations all fall within the scope of the instant invention. For example, a variant is to add first the dense, inert liquid in excess and thereafter add the requisite amount of salt and acid in the order named. The resulting suspension at pH 5–7 is then processed in accordance with the other features of the invention.

After removing the precipitated impurities the clear aqueous liquor is further treated to salt out the circulatory hormone. This is accomplished by saturating the aqueous liquor with ammonium sulfate or sodium sulfate. The circulatory hormone may be collected in any fashion but here again it is convenient to mix with the aqueous suspension a suitable quantity of a dense, inert, water-immiscible liquid of the type already indicated. The fine particles of the circulatory hormone at the liquid-liquid interface are thereafter readily removed by decantation, filtration or centrifugation. In this step the amount of immiscible liquid required is usually about 1/20 to 1/50 of the volume of the aqueous phase. The resulting powder, ranging in color from white to yellow contains at least 5,000 circulatory hormone units per gram and in this form is suitable for peroral use. For intravenous use the product is preferably further purified and concentrated by dissolving the hormone in water, dialyzing the hormone solution against water, freezing the dialyzed solution and evaporating the ice at low temperatures and low pressures, thereby obtaining the hormone preparation in the form of a bulky pulverulent mass readily soluble in water and, when so dissolved, suitable for injection.

Generally speaking these further steps of purification are subject to considerable variation while taking into account the properties of the circulatory hormone. The dialysis is preferably conducted below 20° C. in order to minimize thermal deterioration of the hormone and a preservative such as chloroform or toluene should be present to prevent attack by microorganisms. The removal of ice from the frozen dialyzed hormone solution is best conducted after the solution has been treated with a preservative, filtered through a Seitz filter or similar device and the aqueous liquid transferred into ampules. The ice is removed from the frozen contents of the ampules below 0° C. and this requires that the system be evacuated to not more than 2 mm. pressure and preferably 60–400 microns.

The following specific embodiment will serve to illustrate more fully how my invention may be practiced:

Twenty-five kilograms of fresh or frozen hog pancreas are trimmed to remove superficial fat, are comminuted to a paste and are then stirred with approximately 75 kilograms of water at a temperature of about 5–10° C. While distilled water is preferred for this purpose tap water is quite satisfactory. Normal sodium hydroxide solution is next added slowly until the pH value of the mixture is approximately 8.0 to 8.3, following which the mixture is stirred or agitated for approximately an hour and then centrifuged. The residue left after centrifuging consists almost entirely of fibrous tissue, and this is re-extracted with 25 kilograms of water, centrifuged and the two extracts combined.

A sufficient amount of a water solution of trypsin to introduce approximately 100 grams of trypsin into the combined extracts is then added. A convenient trypsin preparation for this purpose is "Difco-Trypsin (1:250)," a commercial product in which each gram is capable of digesting 250 g. of casein in accordance with the U. S. P. XI assay for pancreatin. After the indicated amount of trypsin has been added the pH of the mixture is readjusted with additional alkali (normal sodium hydroxide) to approximately pH 8.0 The mixture is then warmed to about 37° C. and about 500 cc. of toluene are added. The temperature and the pH value are maintained substantially constant for a period of at least approximately 2½ hours, but it is preferable to maintain the indicated conditions for a period of about 12 to 15 hours, i. e., over night. The digested mixture is then cooled to about 10° C. and 20% trichloroacetic acid is gradually added until the pH value becomes approximately 6.0. At this stage solid ammonium sulfate is added until 0.30 to 0.35 saturation is reached (approximately 250 grams of ammonium sulfate per kilogram of solution) and the mixture so produced is stored cold for a period of at least about 3 to 4 hours, and preferably for a period of 12 to 15 hours, i. e., over night, and then stirred vigorously with about 1/20 to 1/10 of its volume of inert dense liquid (preferably chloroform), the exact quantity of which is determined by centrifuging test samples after varying quantities of the liquid have been added to the main batch. The desired amount of dense inert liquid is that which is adequate to produce a complete settling of the insoluble matter with the concurrent formation of a supernatant solution which is clear and pale yellow in color. This mixture is centrifuged to separate the precipitate, which is practically inactive and which is, therefore, discarded and the solution is brought practically to the saturation point with ammonium sulfate, following which the saturated solution is stored cold over night. The amount of ammonium sulfate required by the foregoing is approximately 1.8 times the amount which was previously added. The mixture is stirred vigorously with about 1/50 to 1/20 its volume of chloroform, whereupon the resultant precipitate is removed, as by centrifuging. This precipitate is agitated several times with acetone (a total of about 5 liters of acetone is used and three washings suffice), decantation through a Buchner funnel following each such agitation with acetone and the material is finally filtered and dried in vacuo over calcium chloride at a temperature of approximately 37° C. It has been found that the washings with acetone in the manner described greatly facilitate the drying of the product.

The dry product produced at this stage is usually characterized by a white or dull yellow coloration and contains approximately 5,000 circulatory hormone units per gram. In this form the powder is suitable for peroral use. For parenteral use the peroral powder is dissolved in a minimal amount of distilled water, disregarding a small amount of insoluble material and dialyzed over night under toluene in cellophane tubing against tap water and subsequently against distilled water for a period of a few hours. The toluene layer is then separated and the volume of the aqueous solution adjusted to the desired concentration by the addition of distilled water. Approximately 0.1% of the chlorobutanol is added for preservative purposes and the solution is then centrifuged and filtered under sterile conditions through a Seitz filter into a sterile flask, from which it is filled into ampules. The contents of the ampules are frozen and the ice thus formed removed either by evaporation or by sublimation at low pressure, (as much below 2 mm. as possible) following which the ampules are aseptically sealed.

It is to be understood that the foregoing is intended as illustrative and not as limitative, and that various additions, omissions, substitutions and modifications may be made, without departing from the spirit of the invention. The scope is rather that defined by the subjoined claims.

What I claim as my invention is:

1. The process for producing a highly potent circulatory hormone preparation having peripheral vasodilatory action and being substantially free from physiologically significant amounts of peptone, insulin, histamine, choline, adenosine, adenylic acid and other deleterious impurities which comprises: extracting animal pancreas with a dilute aqueous alkaline solution; enzymatically hydrolyzing said alkaline extract with tryspin; adjusting the resulting aqueous hydrolysate to pH 5–7 and adding a water-soluble protein-precipitating salt in amount sufficient to precipitate substantially all of the saline-solution-insoluble impurities while retaining substantially all of the circulatory hormone dissolved in the aqueous liquor and also adding, with thorough mixing, a dense, inert, water-immiscible liquid in amount sufficient to clarify the aqueous phase; removing the precipitated impurities and the dense, inert, water-immiscible liquid; adding to the aqueous liquor a salt of the group consisting of ammonium sulfate and sodium sulfate in amount sufficient for approximate saturation of the aqueous liquor; and collecting the precipitated circulatory hormone.

2. The process according to claim 1 wherein the adjustment to pH 5–7 is accomplished by means of trichloroacetic acid.

3. The process according to claim 1 wherein the saline-solution-insoluble impurities are precipitated by adding to the aqueous solution a water-soluble protein-precipitating neutral sulfate salt of a monoacidic base in amount sufficient for 1/4 to 1/2 saturation.

4. The process according to claim 1 wherein the collected circulatory hormone is further treated by: washing with a volatile, inert water-miscible liquid, dissolving the hormone in water, dialyzing the resulting hormone solution against water, freezing the dialyzed hormone solution, and removing the ice at low temperatures and low pressures, thereby obtaining the circulatory hormone preparation in a bulky pulverulent form readily soluble in water and, when so dissolved, suitable for injection.

5. The process according to claim 1 wherein the collected circulatory hormone is further treated by: washing with acetone, dissolving the hormone in water, dialyzing the resulting hormone solution against water, freezing the dialyzed hormone solution and removing the ice at low temperatures and low pressures, thereby obtaining the circulatory hormone preparation in a bulky pulverulent form readily soluble in water and, when so dissolved, suitable for injection.

6. The process according to claim 1 wherein the dense, inert, water-immiscible liquid is a halohydrocarbon.

7. The process according to claim 1 wherein the dense, inert, water-immiscible liquid is chloroform.

8. The process for producing a highly potent circulatory hormone preparation having peripheral vasodilatory action and being substantially free from physiologically significant amounts of peptone, insulin, histamine, choline, adenosine, adenylic acid and other deleterious impurities which comprises: extracting animal pancreas with a dilute aqueous alkali metal hydroxide solution; enzymatically hydrolyzing said alkaline extract with trypsin; adjusting the resulting aqueous hydrolysate to PH 5–7 by means of trichloroacetic acid and adding a water-soluble protein-precipitating neutral sulfate salt of a monoacidic base in amount sufficient for 1/4 to 1/2 saturation and also adding, with thorough mixing a halohydrocarbon in amount sufficient to clarify the aqueous phase; removing the precipitated impurities and the halohydrocarbon by centrifugation; adding to the aqueous liquor a salt of the group consisting of ammonium sulfate and sodium sulfate in amount sufficient for approximate saturation of the aqueous liquor and collecting the precipitated circulatory hormone.

9. The process for producing a highly potent circulatory hormone preparation having peripheral vasodilatory action and being substantially free from physiologically significant amounts of peptone, insulin, histamine, choline, adenosine, adenylic acid and other deleterious impurities which comprises: extracting animal pancreas with a dilute aqueous alkali metal hydroxide solution; enzymatically hydrolyzing said alkaline extract with trypsin; adjusting the resulting aqueous hydrolysate to pH 5-7 by means of trichloroacetic acid and adding a water-soluble protein-precipitating neutral sulfate salt of a monoacidic base in amount sufficient for $\frac{1}{4}$ to $\frac{1}{2}$ saturation and also adding, with thorough mixing, a halohydrocarbon in amount sufficient to clarify the aqueous phase; removing the precipitated impurities and the halohydrocarbon by centrifugation; adding to the aqueous liquor a salt of the group consisting of ammonium sulfate and sodium sulfate in amount sufficient for approximate saturation of the aqueous liquor and collecting the precipitated circulatory hormone; washing the collected hormone with acetone; dissolving the hormone in water; dialyzing the resulting hormone solution against water, freezing the dialyzed hormone solution and removing the ice at low temperatures and low pressures; thereby obtaining the circulatory hormone preparation in a bulky pulverulent form readily soluble in water and when so dissolved, suitable for injection.

10. The process according to claim 9 wherein removal of the precipitated circulatory hormone is facilitated by mixing with the aqueous hormone suspension a halohydrocarbon in amount sufficient to clarify the aqueous phase and thereafter removing the circulatory hormone.

11. A highly potent circulatory hormone preparation from animal pancreas, having peripheral vaso-dilatory action, and being substantially free from physiologically significant amounts of peptone, insulin, histamine, choline, adenosine, adenylic acid and other deleterious impurities and being further characterized by its lability in the wet state to heat and to solutions of pH of less than 5 and greater than 9, by its denaturation by alcohol, by its denaturation on acetone-precipitation, by its stability to tryptic digestion, by its thermostability in the dry state, and by its optimum stability in solutions of pH of 5 to 7, said hormone preparation being a water soluble powder ranging in color from white to yellow, and having a potency of at least 5,000 units per gram, wherein the unit is defined as the quantity of hormone which, when injected intravenously into an atropinized dog under sodium barbital anesthesia will exactly counteract the pressor effect of a minimal hypertensive dose of epinephrine.

12. A highly potent circulatory hormone preparation from animal pancreas, having peripheral vaso-dilatory action, and being substantially free from physiologically significant amounts of peptone, insulin, histamine, choline, adenosine, adenylic acid and other deleterious impurities and being further characterized by its lability in the wet state to heat and to solutions of pH of less than 5 and greater than 9, by its denaturation by alcohol, by its denaturation on acetone-precipitation, by its stability to tryptic digestion, by its thermostability in the dry state, and by its optimum stability in solutions of pH of 5 to 7, said hormone preparation being a white to yellow bulky, pulverulent mass readily soluble in water and, when so dissolved, suitable for injection, said hormone preparation having a potency of at least 15,000 units per gram, wherein the unit is defined as the quantity of hormone which, when injected intravenously into an atropinized dog under sodium barbital anesthesia will exactly counteract the pressor effect of a minimal hypertensive dose of epinephrine.

13. The process for producing a highly potent circulatory hormone preparation having peripheral vasodilatory action and being substantially free from physiologically significant amounts of peptone, insulin, histamine, choline, adenosine, adenylic acid and other deleterious impurities which comprises: extracting animal pancreas with dilute sodium hydroxide solution; enzymatically hydrolyzing said alkaline extract with trypsin; adjusting the resulting aqueous hydrolysate to pH 5-7 by means of trichloroacetic acid and adding ammonium sulfate in amount sufficient for $\frac{1}{4}$ to $\frac{1}{2}$ saturation and also adding, with thorough mixing, chloroform in amount sufficient to clarify the aqueous phase; removing the precipitated impurities and chloroform by centrifugation; adding to the aqueous liquor ammonium sulfate in amount sufficient for approximate saturation of the aqueous liquor and collecting the precipitated circulatory hormone; washing the collected hormone with acetone; dissolving the hormone in water, dialyzing the resulting hormone solution against water; freezing the dialyzed hormone solution and removing the ice at low temperatures and low pressures; and thereby obtaining the circulatory hormone preparation in a bulky, pulverulent form, readily soluble in water and when so dissolved, suitable for injection.

ALEX LESUK.

REFERENCES CITED

The following references are of record in the file of this patent:

UNITED STATES PATENTS

| Number | Name | Date |
|---|---|---|
| 2,118,117 | Sevag | May 24, 1938 |
| 2,190,248 | Wollheim | Feb. 13, 1940 |
| 2,202,029 | Sevag | May 28, 1940 |
| 2,219,167 | Schultz | Oct. 22, 1940 |
| 2,312,901 | Hartmann | Mar. 2, 1943 |

FOREIGN PATENTS

| Number | Country | Date |
|---|---|---|
| 560,463 | Germany | Oct. 3, 1932 |
| 702,832 | Germany | Feb. 17, 1941 |

OTHER REFERENCES

Naturwissenschaften 17 (1929), page 672.

Modern Drug Encyclopedia, Gutman (1941), pages 602 and 603.

Biochemische Zeitschrift, May 18, 1940, pages 387-96.